May 12, 1936. J. C. GLAUM, JR., ET AL 2,040,478
GAS CUTTING MACHINE
Filed Dec. 12, 1934 3 Sheets-Sheet 2
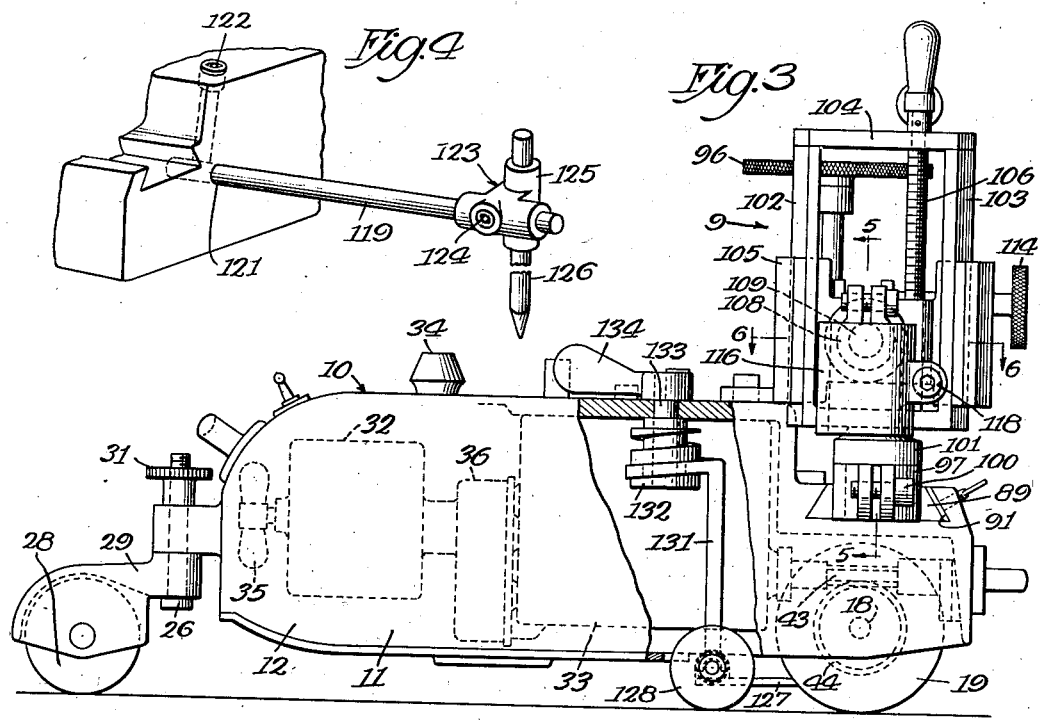
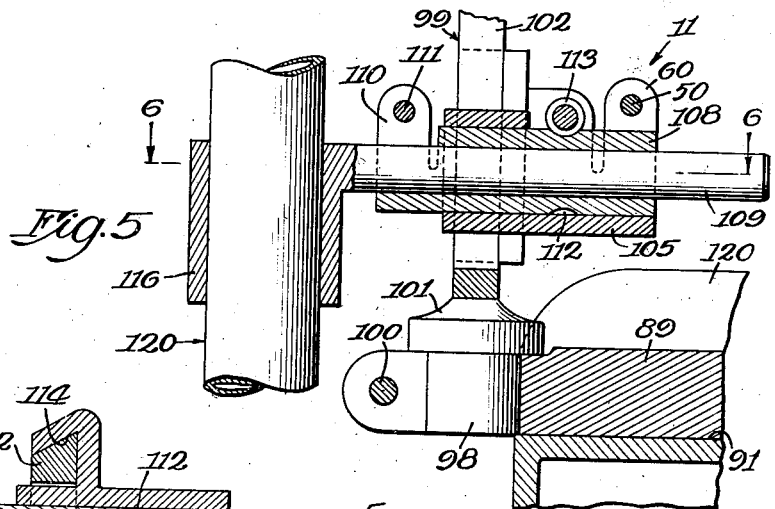
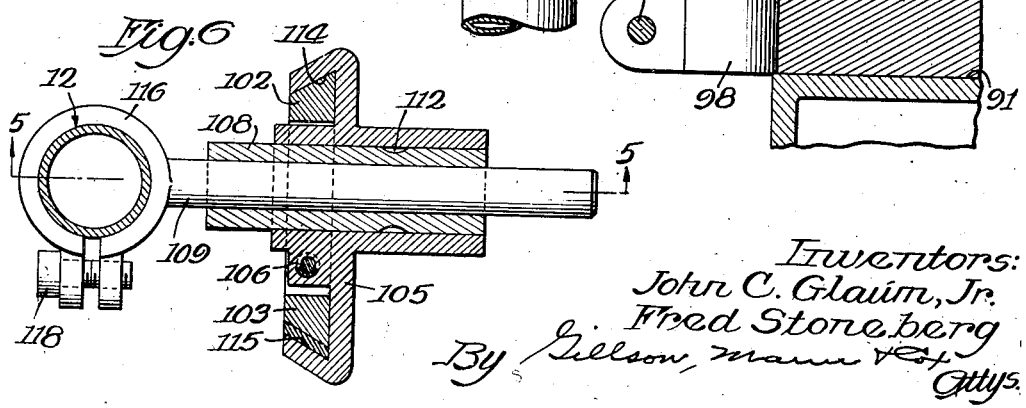
Inventors:
John C. Glaum, Jr.
Fred Stoneberg May 12, 1936.    J. C. GLAUM, JR., ET AL    2,040,478
GAS CUTTING MACHINE
Filed Dec. 12, 1934    3 Sheets-Sheet 3
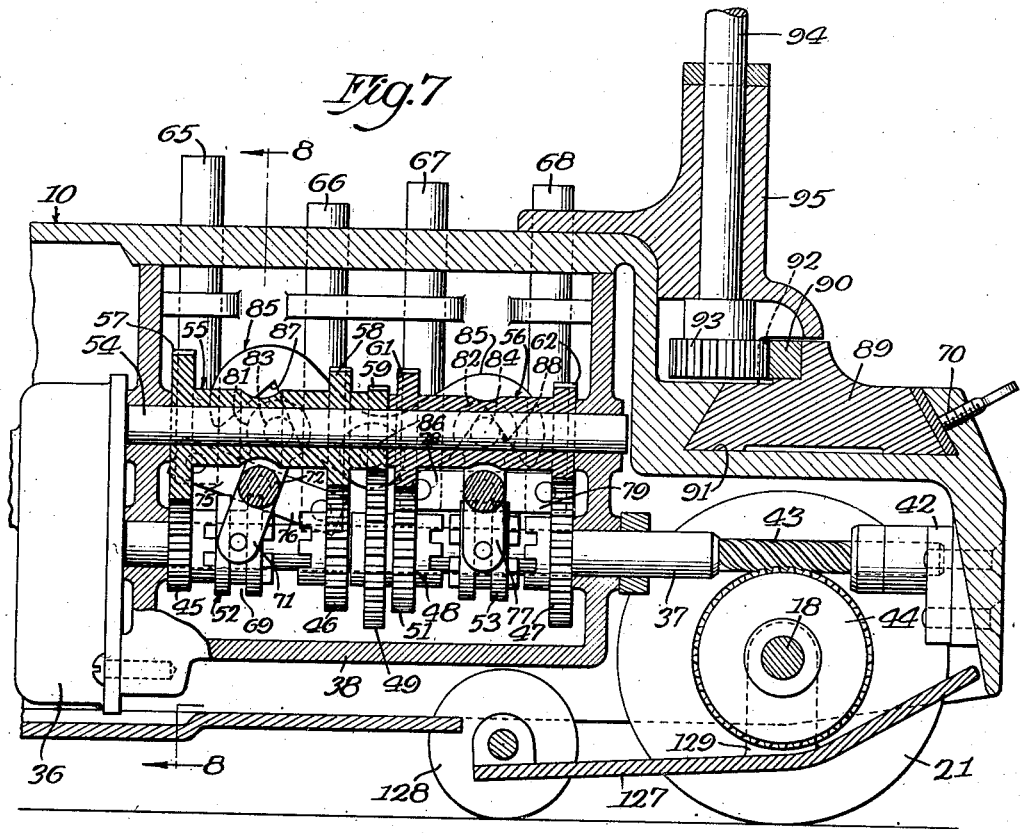
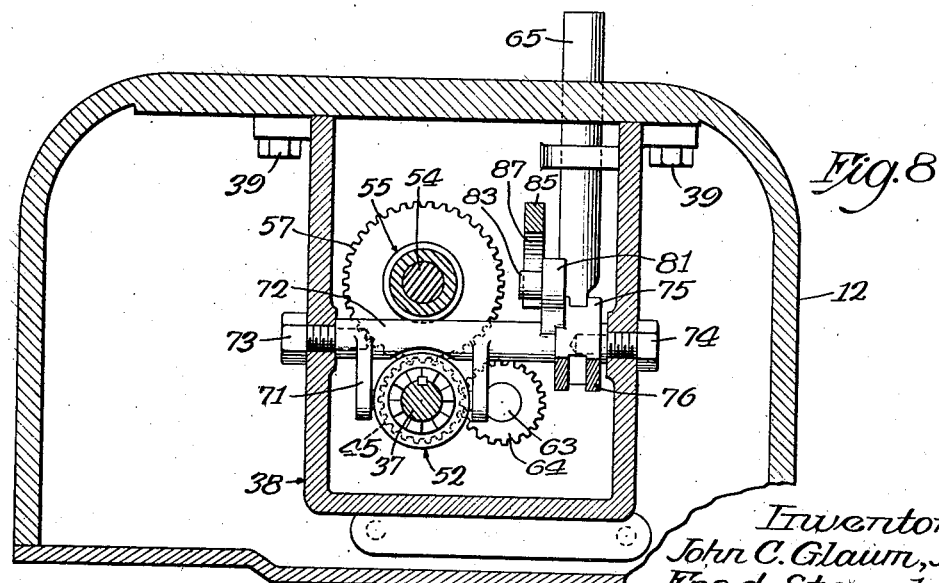
Inventors
John C. Glaum, Jr.
Fred Stoneberg
By Gillson, Mann & Co.
Attys.

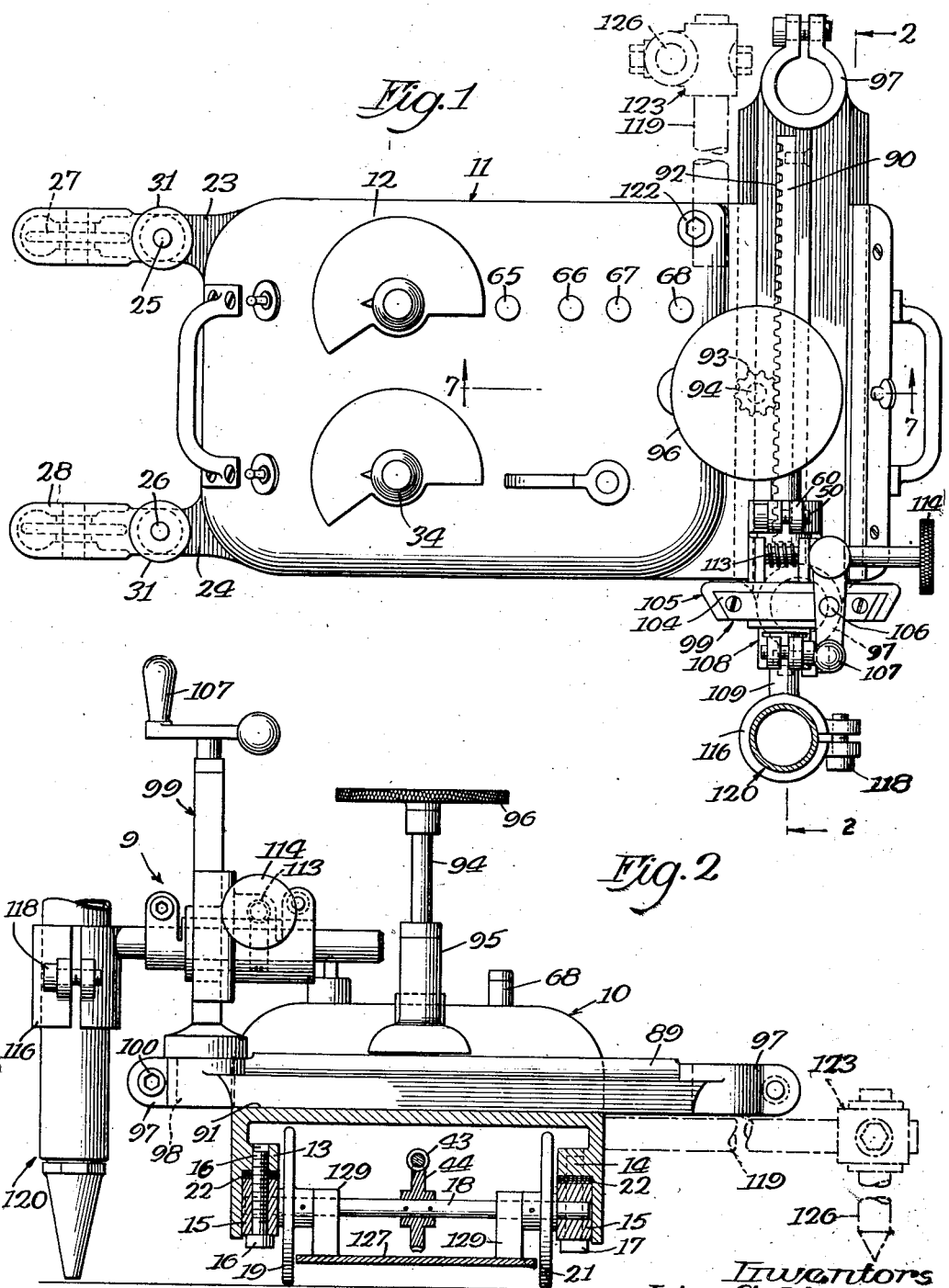

Patented May 12, 1936

2,040,478

UNITED STATES PATENT OFFICE 2,040,478

GAS CUTTING MACHINE

John C. Glaum, Jr., and Fred Stoneberg, Chicago, Ill.

Application December 12, 1934, Serial No. 757,237

10 Claims. (Cl. 266—23)

This invention relates to metal working devices, and more particularly to gas cutting apparatus having novel means for adjusting the torch holding mechanism.

Another object of the invention is the provision of new and improved means for adjustably mounting the torch supporting mechanism on the carriage together with novel means for adjusting the parts of the torch holding mechanism.

A further object of the invention is the provision of new and improved mechanism for propelling the carriage and for changing the speed thereof during the cutting operation.

A still further object of the invention is the provision of a new and improved torch holding mechanism having novel means for adjusting the torch whereby the same may be adjusted to cut bevels of any desired degree.

Another object of the invention is the provision of a new and improved change speed mechanism for gas cutting apparatus that is provided with novel means for changing speed and for locking certain parts while the same are in inoperative position.

A further object of the invention is the provision of a new and improved mechanism for elevating one side of the carriage while the same is being prepared for cutting along circular lines.

Another object of the invention is the provision of a new and improved gas cutting machine that is inexpensive to manufacture, efficient in operation, adjustable to various speeds, and having a torch capable of universal adjustment.

Other and further objects and advantages will appear from the following description, taken in connection with the accompanying drawings, in which:

Fig. 1 is a plan view of the device;

Fig. 2 is a section on the line 2—2 of Fig. 1;

Fig. 3 is a side elevation of the device with parts broken away and parts in section;

Fig. 4 is a perspective view of a portion of the carriage showing the radius member in position thereon;

Fig. 5 is a section on the line 5—5 of Figs. 3 and 6;

Fig. 6 is a section on the line 6—6 of Figs. 3 and 5;

Fig. 7 is a vertical section on the line 7—7 of Fig. 1 with parts broken away; and Fig. 8 is a section on the line 8—8 of Fig. 7.

Referring now to the drawings, the reference character 10 designates the carriage on which is mounted the torch holding and adjusting mechanism 110 and the torch 120.

The carriage comprises the body portion 11 which may be of any suitable construction. In the form of device selected to illustrate one embodiment of the invention, the body is in the form of a hollow casing 12 opening downwardly. Preferably, though not necessarily, this casing is cast and is provided at its forward end portion with lugs 13 and 14 extending inwardly from the side walls of the casing adjacent the lower edge thereof.

Journal blocks 15 (see Fig. 2) are secured to the lugs 13 and 14, as by means of bolts or screws 16 and 17 which extend through the ends of said blocks and engage threaded openings in said lugs. The bearing blocks receive the ends of an axle 18 on which is rigidly secured the driving wheels 19 and 21 for supporting the forward end of the apparatus. Preferably, though not necessarily, shims 22 are inserted between the bearing blocks 15 and the corresponding lugs 13 and 14 (see Fig. 2) so that the bearings may be adjusted to take up the wear in the worm and gear drive by the removal of the shims from time to time as wear occurs, as will presently appear. The rear end of the body is provided with rearwardly extending projections 23 and 24 which are provided with vertical bearings for receiving the journals or journal bolts 25 and 26 of the caster wheels 27 and 28 (see Figs. 1 and 3).

The shanks 29 of the casters are swiveled on the bolts or journals 25 and 26. The upper ends of the journals or bolts 25 and 26 are threaded for receiving the lock nuts 31 (see Fig. 3) by means of the tightening of which the casters may be locked in adjusted position. When the device is used for making curved or circular cuts, the nuts 31 are loosened so as to provide the necessary or swiveling of the casters 27 and 28.

In the use of a gas cutting apparatus, it is necessary that the carriage be provided with mechanism for driving the same at different speeds, depending upon the different conditions under which it is operated. In the present invention, a variable speed electric motor 32 and change speed mechanism 33 are employed for securing the desired speed of the carriage under any and all conditions.

The change speed mechanism provides for four-speed changes and a rheostat 34 is employed for varying the speed of the motor whereby all intermediate speeds may be obtained. In the form of construction shown, which is by way of example only, the motor 32 is mounted within the body 10 at the rear thereof and is provided with a cooling fan 35, as is usual in such constructions.

Suitable mechanism is provided for driving the carriage from the motor 32. This mechanism comprises a transmission 36 in the form of speed reducing mechanism of the conventional type and the change speed mechanism 33, (see Fig. 7). The change speed mechanism comprises a shaft 37 journaled in a housing 38 which in turn is secured within the body of the carriage by suitable mechanism as by means of the screws 39 (see Fig. 8). The forward end of the shaft 37 is journaled in a bearing 42 secured to the front wall of the carriage body, as clearly shown in Fig. 7. The shaft 37 adjacent the forward end is provided with a worm 43 which engages a gear 44 rigidly secured to the axle 18 of the carriage. Rotatably mounted on the shaft 37 are the clutch gears 45, 46 and 47 and the clutch gear cluster 48. The gear cluster 48 comprises the two gears 49 and 51 rigidly connected together. A pair of clutches 52 and 53 are keyed to the shaft 37 and are slidable along the same. Each of these clutch members are provided with clutch teeth at opposite sides thereof for engaging corresponding clutch teeth on the adjacent gears. The housing 38 is provided with a counter shaft 54 on which are mounted the two gear clusters 55 and 56. The gear cluster 55 comprises the gears 57, 58 and 59 which are in permanent engagement with the gears 45, 46 and 49, respectively.

The power shaft 63 from the transmission 36 (see Fig. 8) is provided with a spur gear 64 which is permanently in mesh with the gear 45 on the shaft 37.

Suitable means are provided for operating the clutches 52 and 53. In the form of construction shown, suitable push buttons 65, 66, 67 and 68 are provided for this purpose. The push buttons 65 and 66 are adapted to operate the clutch 52 in a manner that will now be described. The clutch 52 is provided with an annular recess 69 which is adapted to be engaged by inwardly extending fingers on the yoke 71 (see Figs. 7 and 8).

The yoke 71 is provided with a sleeve 72 which is journaled on the inwardly extending ends of studs 73 and 74 (in Fig. 8). These studs are threaded in the walls of the housing 38. The sleeves 72 have rigidly connected thereto two laterally extending shifter arms 75 and 76 (see Fig. 7) which are pivotally connected to the push button rods 65 and 66.

The clutch 53 is provided with a yoke 77 to which is rigidly connected the shifter arms 78 and 79 which are substantially identical with those already described. These arms are pivotally connected to the push buttons or rods 67 and 68, respectively. When the buttons are in the position shown in Fig. 7—that is, when the button 66 is depressed and the clutch 53 is in neutral position, the yoke 71 is shifted toward the left, which will cause the teeth of the clutch 52 to engage those shifted with the gear 45 and the drive then will be through the gears 64 (see Figs. 7 and 8), 45 and the clutch 52 directly to the shaft 37. This gives direct drive which may be termed high speed. When the button 65 is depressed, it will cause the yoke to react in the opposite direction, thereby moving the clutch 52 to the right and causing the teeth of the clutch 52 to engage the teeth associated with the gear 46, then the drive will be through the gears 45, 57, 58 and 46. When the clutch 52 is in neutral position and the button 67 is depressed, the clutch 53 will be moved toward the right, causing the teeth of the clutch 53 to engage those of the gear 47 and the drive will then be through the gears 45, 57, 59, 49, 51, 61, 62 and 47. When the button 68 is depressed while the clutch 52 is in neutral position, the clutch 53 will be moved toward the left, causing engagement of the teeth thereof with the teeth of the gear 51 and the drive will then be through the gears 45, 57, 59, 49 and 51.

The gears 57, 49 and 47 are of greater diameter than the corresponding gears 45, 59 and 62 with which they mesh while the gears 58, 61, 46 and 51 are of the same diameter. As a result, low or first speed is obtained when the button 67 is depressed, second speed when the button 68 is depressed and third speed when the button 65 is depressed.

In order to prevent injury to the change speed mechanism during the changing of the gears, suitable means are provided for locking one of the clutch members in neutral position, while the other is in use.

Any suitable mechanism may be employed for this purpose. In the form of construction shown, the yokes 69 and 71 are provided with upward extensions 81 and 82 having laterally extending pins 83 and 84 thereon. These keepers are adapted to engage angular slots or notches 87 and 88 in the ends of a keeper 85 which is pivoted as at 86. The parts are so constructed that when one of the clutch members is in operative position, as, for instance, when the clutch 52 is in the position shown in Fig. 7, the pin 84 will be engaged in the slot 88, which will prevent movement of the clutch 53 until the clutch 52 is moved to neutral position.

In like manner, when the clutch 53 is in operative position, the pin 83 will engage in the angular recess 87 and prevent movement of the clutch 52 until the clutch 53 is moved to neutral position. It will thus be seen that when either the button 65 or 66 is depressed, the clutch 53 is held in neutral position, and, likewise, when either the button 67 or 68 is depressed, the clutch 52 is held in neutral position.

Appropriate means are provided for supporting the torch. In the form of construction shown, a base or supporting plate 89 is slidably mounted on the carriage and the torch supporting means is mounted on this plate. Preferably, though not necessarily, the top of the casing 12 is depressed at its forward end and is provided with a dovetail groove 91 extending transversely thereof (see Figs. 3 and 7) in which the plate 89 is adapted to slide. Suitable means are provided for adjusting the plate along the groove. In the form of construction shown, the plate is provided with rack teeth 92 (see Figs. 1 and 7) which may be on a rack bar 90 rigidly connected to the plate. These teeth are adapted to be engaged by a pinion or gear 93 carried by a shaft 94 extending upwardly from the casing 12 (see Figs. 2 and 7). The shaft 94 is held in position by any suitable means, as by the sleeve member 95. A hand wheel 96 is provided on the upper end of the shaft 94 for rotating said shaft.

If desired, the plate 89 may be provided with a wear plate 91, (see Fig. 3) opposite the gear 93. A threaded opening 78 may be provided in the wall of the slot for receiving a set screw for locking the plate 89 in any adjusted position.

Both ends of the plate 89 are provided with split sleeves 97 for receiving within either of which may be rotatably mounted the lower end 98 of the supporting standard 99. A clamp screw 100 (see Fig. 5) which may be of the conventional Allen set screw, is provided for clamping the end 98 of the standard 99 in any adjusted position.

The standard 99 (see Figs. 3 and 5) comprises a base 101 on which is rigidly secured the uprights 102 and 103. The uprights 102 and 103 are spaced apart and their upper ends are connected by a cross bar 104. A suitable journal block 105 is slidably mounted on the posts 102 and 103 and is raised and lowered by means of the threaded rod 106 which is journaled in the cross bar 104 and engages a threaded opening in the block 105.

The rod 106 extends above the cross bar and is provided with a crank 107 for rotating said rod. The journal block 105 has rotatably mounted therein an adjusting sleeve 108 within which is slidably and rotatably mounted a torch supporting arm 109 (see Fig. 5). The sleeve 108 is provided with clamping ears 110 which are adapted to receive a clamping screw 111 whereby the arm 109 may be clamped in adjusted position within the sleeve 108. Suitable means are provided for rotating the sleeve 108 within the block 105. As shown, the block is provided with a plurality of teeth 112 extending around its periphery, which are adapted to be engaged by a worm 113. The outer end of the worm shaft 113 may be provided with a knurled knob 114, by means of which the worm may be rotated for angularly adjusting the sleeve 108 within the block 105.

The block 105 is provided with clamping ears 60 which are adapted to receive a clamping screw 50 for clamping the sleeve 108 in adjusted position.

The block 105 is preferably, though not necessarily, provided with under cut grooves 114 and 115 (see Fig. 6) which are adapted to engage inclined surfaces on the outer wall of the standards 102 and 103, as shown in said figure.

The outer end of the arm 109 (see Fig. 6) terminates in a split socket or sleeve 116 for receiving the torch 120. The torch is held in adjusted position by the sleeve 116 which is clamped against the same by any suitable means, as the set screw 118.

In the operation of the device, when it is desired to arrange the torch at an angle in a plane parallel to the direction of travel, the knob 114 may be turned, or, if desired, the set screw 111 may be loosened, and the arm 109 turned by hand to the desired angle. When it is desirable to move the torch outwardly from the carriage, this may be done by rotating the hand wheel 96 which will move the plate 89 outwardly or the gear 111 may be loosened and the arm 109 slid through the sleeve 108. When it is desired to arrange the torch at an angle transversely to the direction of travel, the torch is first moved outwardly and then the arm 109 rotated, the screw 100 loosened and the support 99 rotated about its vertical axis through an angle of 90°. It will thus be seen that the arm 109 may be rotated about two axes at right angles to each other, thereby giving universal movement or adjustment to the torch 120.

Means are provided for making circular cuts with the apparatus. As shown, a radius member or rod 119 (see Figs. 1 and 4) is provided for determining the radius of the curve to be cut. This member is adapted to be detachably mounted in a socket 121 in the side of the casing 12 and held therein by any suitable means, as the Allen set screw 122.

Slidably mounted on the outer end of the rod 119 is a head 123 which is held in adjusted position by the set screw 124. The head 123 is provided with a sleeve 125 in which is slidably mounted a centering arm 126. The centering arm is pointed at its lower end and is adapted to engage a depression for guiding the carriage in its circular movement.

When it is desired to make circular cuts, a depression in the center of the circle is made, the radius rod 119 is attached, the side of the carriage adjacent the rod is elevated and the centering arm is depressed into the depression and clamped in position to hold the inner wheels elevated whereby the outer wheels of the carriage are free to move in a circle about the depression. The clamp 31 of the outer caster is released so that the wheel is free to turn about a vertical axis during the circular movement of the carriage.

Suitable means are provided for what might be termed free wheeling—that is, for moving or transporting the apparatus without operating any of the driving mechanism. Any suitable means may be employed for this purpose. In the form of construction shown, which is by way of example only, two supporting wheels are employed for this purpose. As shown in Figs. 2 and 7, a plate 127 having wheels 128 rotatably mounted in its rear end has lugs 129 for pivotally connecting the plate to the axle 18. These wheels are adapted to be forced downwardly by a thrust member 131, the upper end of which engages spiral threads 132 in the lower end of an adjusting member (see Fig. 4) 133. The adjusting member 133 extends to the upper surface of the casing 12 and is provided with a handle 134 for operating the same.

When it is desired to manually move the carriage, the wheel 128 is depressed by turning the handle 134 which will, through the threads 132 and thrust member 131, elevate the front of the carriage, thus raising the front wheels 19 and 21 of the carriage free from the supporting surface. The carriage may then be moved without turning the wheels 19 and 21.

We claim as our invention:—

1. In a gas cutting apparatus, a carriage, a torch support, a torch slidable through said support, means for clamping said torch in position on said support, said support comprising a base plate movable transversely to said carriage, an upright standard mounted on said plate to rotate about a vertical axis, and a supporting arm, slidably and rotatably mounted on said standard.

2. In a gas cutting apparatus, a carriage having a casing provided with a downward offset in its upper portion at the forward end, a slideway in said downward offset portion, a supporting member slidably mounted in said slideway, a standard pivotally mounted in said member and extending upwardly therefrom, an arm slidably and rotatably mounted on said standard, and a clamping sleeve carried by said arm.

3. In a gas cutting apparatus, a carriage comprising a casing, an axle extending through said casing, wheels on said axle for supporting the forward end of said carriage, a plate pivotally secured to said axle and extending rearwardly therefrom beneath said carriage, wheels carried by the free end of said plate, and means extending to the exterior of said casing for forcing the free end of said plate downwardly for elevating one end of said carriage and supporting the same on said last-named wheels.

4. In a gas cutting machine, a carriage, a supporting plate slidably mounted on said carriage and slidable transversely thereof, an upright standard journaled in said plate and rotatable about a vertical axis, a torch supporting arm mounted on said standard and rotatable about a horizontal axis and a torch carried by said arm.

5. In a gas cutting apparatus, a carriage having a slideway on its upper surface extending transversely thereof, a supporting plate mounted on said carriage and slidable in said slideway, a torch supporting arm, and a universal connection between said torch and plate, whereby said torch may be adjusted at an angle to said carriage both longitudinally and transversely thereof.

6. In a gas cutting apparatus, a carriage, change speed gearing for driving said carriage at different speeds, said gearing comprising a plurality of clutch members, and means for selectively moving any one of said clutch members into operative position and simultaneously locking the remainder in neutral position, and a variable speed motor for operating said carriage through said gearing.

7. In a gas cutting apparatus, a carriage comprising a hollow inverted casing, lugs extending inwardly from the inner side of said casing adjacent its forward end, grooves on the inner faces of said lugs opening downward, bearing blocks slidable in said grooves, means including shims between said lugs and bearings, a wheeled axle journaled in said bearings, lugs extending rearwardly from said casing, caster wheels, means for swivelly connecting said wheels to said lugs, and means for locking said wheels from angular movement, a plate pivotally connected to said axle, wheel means at the free end of said plate, and means for raising and lowering said plate for lowering and raising the forward end of said carriage.

8. In a gas cutting apparatus, a carriage, a wheel at each side of said carriage at each end thereof, an axle for the front wheels, and means for elevating one end of said carriage, said means comprising a member hinged to said axle, a wheel on the free end of said member, a thrust member for raising and lowering said wheel, and means for raising and lowering said thrust member.

9. In a gas cutting apparatus, a carriage, torch supporting mechanism adjustably mounted on said carriage, said mechanism comprising a pair of upstanding members, a slide block slidably mounted on said members, a sleeve journaled in said block, means for rotating said sleeve, a torch arm slidably mounted in said sleeve, means for locking said arm to said sleeve, and means for locking said sleeve against rotation.

10. In a gas cutting apparatus, a carriage comprising a casing, a torch supporting mechanism adjustably mounted on said carriage, said mechanism comprising a supporting plate slidably mounted directly on said casing, said plate having a bearing on each end thereof for receiving the lower end of a supporting standard, and means for selectively clamping said end in either of said bearings.

JOHN C. GLAUM, Jr.
FRED STONEBERG.